UNITED STATES PATENT OFFICE.

JOHN WESLEY BARBER, OF NEWTON, MASSACHUSETTS.

FLEXIBLE AND WATERPROOF POROUS MATERIAL AND METHOD OF MAKING THE SAME.

1,167,327. Specification of Letters Patent. Patented Jan. 4, 1916.

No Drawing. Application filed June 9, 1913. Serial No. 772,716.

*To all whom it may concern:*

Be it known that I, JOHN WESLEY BARBER, advertising agent, of Newton, in the county of Middlesex and State of Massachusetts, have invented certain new and useful Improvements in Flexible and Waterproof Porous Material and Methods of Making the Same, of which the following is a specification.

This invention relates to the manufacture of waterproof and more or less flexible porous material.

One of the objects of the invention is to produce waterproof leather in which the waterproofing material is so confined in the body of the finished product by a final treatment that the waterproofing composition cannot exude, and so that the durability of the product will be increased to the utmost, and the flexibility thereof will be increased.

For the sake of brevity of description hereinafter, I shall employ the word "composition" in referring to the material which is used to impregnate the leather.

Some of the waterproofing substances that may be uesd either singly or combined are white or yellow wax, Burgundy pitch, colophony, vaseline, resin, paraffin, cerin, Chinese wax, ozocerite, asphalt, bitumen waxes, fossil wax, myricin and stearin. With these substances I may employ any of various solvents, such as naphtha, sulfid of carbon, ether, chloroform, and so forth, or heat may be employed to place the composition or compositions in condition for treatment of the material.

My invention consists chiefly in first employing an ingredient or composition which, while capable of rendering the material fully waterproof, would not be durable for the reasons hereinafter explained, and then employing a second ingredient or composition differing somewhat from the first, which will confine the first composition within the body of the porous material. And both compositions are of such nature that instead of rendering the finished product stiffer, its flexibility will be increased. In other words, I effectually seal the first-applied ingredient by impregnating the outer or surface portions of the material with a varying and usually heavier substance which is waterproof in its nature, so that the final product can be used until worn through, without losing either its flexibility or its waterproof nature. For instance, the first treatment may consist in impregnating leather with a composition including both paraffin and vaseline, and the second treatment may consist in impregnating the material with a composition including both paraffin and vaseline, but the first-used composition contains a considerably greater proportion of vaseline than the second-used composition.

In carrying out my invention, I impregnate the material successively with dissimilar compositions which, however, possess such related natures or characteristics, as above stated, as not to be antagonistic to each other. A composition which can be caused, either by heat or a solvent, to thoroughly permeate the body, is almost certain to exude, so that leather, or articles such as shoes made therefrom, will not retain flexibility and proof against moisture, but will lose these properties long before being worn out, as by being exposed to atmospheric or climatic changes. To cause the articles to retain to the utmost the desired durability, I finally apply, as stated above, by immersion or otherwise, a composition of a heavier nature than the first, but of a sufficiently similar nature thereto, to confine the first so that it cannot escape,—this final composition being, of course, also of a waterproofing nature, which is put in condition to be applied by a suitable solvent, or by heat. The said final composition is preferably of a crystalline nature for the purpose already specified. If under extraordinary conditions the wearing portions of a boot or shoe made from leather that has been treated as above described should be acted upon in such a manner that water might be absorbed to some extent, those portions of the leather, such for instance as that portion of the sole nearest the foot, which has not been subject to wear, would still be an effectual barrier against the passage of moisture through the outer portion, therefore effectually providing a boot or shoe sole which is immune to dampness until the leather is entirely worn through.

The invention is of special utility for making two or more pieces of leather or wood which are cemented together, durable and waterproof, because the cement, if unprotected, is affected by dampness. By treating such leather or wood in the manner described, it is impossible for any moisture to gain access to the cement. For instance, in the modern construction of a boot or shoe, the welt or welting is usually taken from a roll made up of a plurality of strips which are skived and cemented. By treating such welting in the manner above described, the manufactured shoe then has a welt which is not only water-excluding but contains a substance or substances which render it impossible that water shall leak through the stitch holes. It is to be understood, of course, that the particular ingredients or compositions employed may vary somewhat according to the nature of the material to be treated, or the kind of article which is made therefrom.

I claim:

1. The method of waterproofing flexible porous material, consisting in impregnating it successively with differently proportioned compositions of waterproofing substances of the characteristics specified and containing the same ingredients, the last impregnation causing the porous material to absorb the last applied composition and to combine it with and confine the previously applied composition.

2. The method of waterproofing leather and increasing its flexibility, consisting in impregnating it successively with differently proportioned compositions of waterproofing substances of the characteristics specified and containing the same ingredients, having such related natures or characteristics as not to be antagonistic to each other, the last impregnation causing the leather to absorb the last applied composition and to blend it with and confine the previously applied composition in the body of the leather.

3. As an article of manufacture, flexible porous material impregnated with differently proportioned waterproofing compositions of the characteristics specified and containing the same ingredients, the last applied waterproofing composition being absorbed by the porous material and confining the other impregnating composition within the body of the porous material.

4. As an article of manufacture, leather impregnated successively with differently proportioned compositions of waterproofing substances of the characteristics specified and containing the same ingredients and having such related natures or characteristics as not to be antagonistic to each other, the material of the last impregnation being absorbed by the leather and blended with the previously applied composition, and confining the latter in the body of the leather.

5. As an article of manufacture, leather impregnated with a plurality of waterproofing compositions including a crystalline substance, the last applied composition having a larger proportion of the crystalline substance than the preceding composition, the purpose thereof being to blend with and confine the preceding composition, and to provide a filling for the leather which will prevent the passage of water through holes made by a needle and thread.

In testimony whereof I have affixed my signature, in presence of two witnesses.

JOHN WESLEY BARBER.

Witnesses:
EDWARD W. BLODGETT,
GRACE I. BENTLEY.